US008084108B2

(12) United States Patent
Niu et al.

(10) Patent No.: US 8,084,108 B2
(45) Date of Patent: Dec. 27, 2011

(54) CORE HAVING ENHANCED ID STIFFNESS AND METHOD FOR MANUFACTURING THE SAME

(75) Inventors: Xiaokai Niu, Hartsville, SC (US); David E. Rhodes, Hartsville, SC (US); Neil R. Davis, Asheboro, NC (US)

(73) Assignee: Sonoco Development, Inc., Hartsville, SC (US)

( * ) Notice: Subject to any disclaimer, the term of this patent is extended or adjusted under 35 U.S.C. 154(b) by 665 days.

(21) Appl. No.: 12/258,054

(22) Filed: Oct. 24, 2008

(65) Prior Publication Data

US 2010/0104782 A1 Apr. 29, 2010

(51) Int. Cl.
*F16L 11/00* (2006.01)
*B31C 1/00* (2006.01)

(52) U.S. Cl. ....... 428/34.2; 138/129; 138/130; 138/144; 156/184

(58) Field of Classification Search ........ 428/34.1–34.3; 156/195, 190, 425–429; 138/130, 144, 129; 242/610.1
See application file for complete search history.

(56) References Cited

U.S. PATENT DOCUMENTS

| | | | | |
|---|---|---|---|---|
| 1,251,393 | A | 12/1917 | Longley | |
| 4,923,137 | A | 5/1990 | Jorgensen et al. | |
| 5,505,395 | A | 4/1996 | Qiu et al. | |
| 5,669,578 | A | 9/1997 | Ma | |
| 5,873,543 | A | 2/1999 | Schneider et al. | |
| 6,405,974 | B1 | 6/2002 | Herrington | |
| 6,460,796 | B1 | 10/2002 | Berning et al. | |
| 6,851,643 | B2 | 2/2005 | Qiu et al. | |
| 6,939,590 | B2 | 9/2005 | van de Camp et al. | |
| 7,712,487 | B2 * | 5/2010 | van de Camp | 138/129 |
| 2004/0096604 | A1 | 5/2004 | van de Camp | |
| 2007/0059467 | A1 | 3/2007 | van de Camp | |
| 2008/0060746 | A1 * | 3/2008 | van de Camp | 156/184 |

FOREIGN PATENT DOCUMENTS

| | | | |
|---|---|---|---|
| EP | 1 900 507 | A1 | 3/2008 |
| JP | 9-234808 | A | 9/1997 |

OTHER PUBLICATIONS

European Search Report for Application No. EP 09 25 1492 dated Apr. 9, 2010.

* cited by examiner

*Primary Examiner* — Rena Dye
*Assistant Examiner* — Yan Lan
(74) *Attorney, Agent, or Firm* — Alston & Bird LLP

(57) ABSTRACT

A core having enhanced ID stiffness is provided. The core includes inner, intermediate, and outer wall zones. The intermediate zone is spring-like in that it minimizes deformation of the inner zone from a radial deflection of the outer zone by absorbing at least some of the deformation. Similarly, the intermediate zone minimizes deformation of the outer zone from a radial deflection of the inner zone by absorbing at least some of the deformation. The intermediate zone includes at least first and second intermediate layers and one or more intermediate support layers. The first and second layers include a number of plies and gaps that are offset from each other, i.e. the plies of the first layer are radially aligned with the gaps of the second layer. The intermediate support layers are between the first and second layers and extend radially across the gaps of the first and second layers.

11 Claims, 3 Drawing Sheets

CORE HAVING ENHANCED ID STIFFNESS AND METHOD FOR MANUFACTURING THE SAME

FIELD OF THE INVENTION

The invention relates to winding cores or tubes made by spirally winding a plurality of paperboard plies about a forming mandrel and adhering the plies together.

BACKGROUND OF THE INVENTION

Spirally wound tubes are used in a variety of applications in which radially inward compressive forces are imposed on the outside diameter ("OD") of the tubes. For example, continuous materials such as paper, plastic film, metal sheet, and textiles are commonly wound about winding cores formed of spirally wound paperboard tubes. The winding tension required for winding a stable roll of such materials results in substantial compressive forces being exerted by the wound material on the tube in the radially inward direction. Such forces are in a direction to tend to force the inner diameter ("ID") of the tube to shrink in size. This phenomenon has been referred to as "ID comedown."

The degree to which a given paperboard tube resists such inner diameter reduction under a given load is referred to herein as the ID stiffness of the tube. The ID stiffness may be expressed as the amount of radially inward uniform compressive pressure on the tube's OD that the tube can withstand for a given amount of ID reduction; thus, for instance, the ID stiffness may have units of psi per inch of inner diameter reduction.

In web winding applications, it is desirable to have a high ID stiffness so that the tube can readily be removed from a winding apparatus after a roll of web material is wound onto the tube. A winding apparatus typically includes some type of chuck or mandrel that is inserted into the tube and is radially expanded to grip the core from the inside. If the tube inner diameter shrinks too much as a result of the forces imposed by the wound material, it can be difficult or impossible to remove the tube from the winding apparatus without destroying the tube.

It is also desirable to have a high OD stiffness. The OD stiffness of a core is the degree of resistance of the core to growth in outside diameter caused by radially-outward pressure exerted on an inner surface of core, such as by expandable winding chucks or mandrels. Such OD growth can lead to problems, particularly when the chucks or mandrels are retracted and the OD shrinks back toward its original size. This can cause a loss of tension in the inner layers of the wound roll of material, which can lead to loss of roll stability, particularly for slippery materials such as sheet metal. It is desirable in many cases to maximize the OD stiffness of a core.

The assignee of the present application has previously discovered that the core's ID stiffness and/or OD stiffness can be increased by forming the core wall to have a radially central region whose compliance in the radial direction is increased relative to that of the core wall regions lying radially inward and radially outward of the central region. See, for example, U.S. Pat. No. 5,505,395, incorporated herein by reference. In the '395 patent, this increased compliance was achieved by using paperboard plies of lower density and strength in the central region of the wall relative to the density and strength of the plies lying radially inward and outward of the central region. Also see, for example, U.S. Pat. No. 6,851,643, incorporated herein by reference. In the '643 patent, this increased compliance was achieved by intentionally introducing wide ply gaps into one or more plies of the central region.

While the approaches represented by the '395 and '643 patents are effective in enhancing the ID stiffness of tubes, it would be desirable to be able to achieve even greater gains in ID stiffness, and to do so in a cost-effective manner.

BRIEF SUMMARY OF THE INVENTION

The present invention addresses the above concerns and achieves other advantages by providing a spirally wound paperboard tube have enhanced ID stiffness. The paperboard tube includes a spring-like intermediate zone between an outer zone and an inner zone. The intermediate zone includes offset plies and gaps that allow radial deflection of the inner zone toward the outer zone while reducing the deformation of the outer zone, i.e. the intermediate zone absorbs at least some of the deformation rather than the outer zone. Similarly, the intermediate zone also allows radial deflection of the outer zone toward the inner zone while reducing the deformation of the inner zone.

According to one embodiment of the present invention the spirally wound tube includes an inner zone, an outer zone, and an intermediate zone. The inner zone is located radially inwardly and includes one or more inner layers. Each inner layer includes one or more inner plies. The outer zone is located radially outwardly and includes one or more outer layers. Each outer layer includes one or more outer plies. The intermediate zone is located between the outer zone and the inner zone and includes more than one intermediate layer. Each intermediate layer includes one or more one intermediate plies.

In particular, the intermediate zone includes at least a first intermediate layer, a second intermediate layer, and at least one support layer. The first intermediate has one or more first intermediate plies that are spirally wound with first gaps between adjacent edges of the first intermediate plies. The second intermediate layer has one or more second intermediate plies that are spirally wound with second gaps between adjacent edges of the second intermediate plies. The first gaps are radially aligned with the second intermediate plies and the second gaps and the second gaps are radially aligned with the first intermediate plies. And the support layer or layers is between the first and second intermediate layers.

One or more of the support layers may include one intermediate support ply that is wound with substantially no gaps between adjacent edges of the intermediate support ply. Also, according to some embodiments, the intermediate zone includes a plurality of support layers that define a first set of intermediate layers.

The intermediate zone may further include a second and a third set of intermediate layers. For example, a second set of intermediate layers may include the first intermediate layer and at least one additional intermediate layer. The at least one additional layer has one or more intermediate plies that are spirally wound with gaps between adjacent edges of the intermediate plies, and the gaps of the at least one additional layer are radially aligned with the first gaps of the first intermediate layer.

Similarly, the intermediate zone may include a third set of intermediate layers that includes the second intermediate layer and at least one additional intermediate layer. The at least one additional layer has one or more intermediate plies that are radially aligned with the second gaps of the second intermediate layer.

Each ply and gap defines a width. The widths of the plies and gaps may vary relative to each other. For example, the width of each first and second intermediate ply in the first and second intermediate layers may be less than half the width of the intermediate support ply of the at least one support layer. The width of the first and second intermediate plies of the first and second intermediate layers may be less than, equal to, or greater than the first and second gaps of the first and second intermediate layers.

In another aspect, the present invention provides a method of constructing a paperboard tube having an enhanced ID stiffness. The method includes spirally winding one or more inner plies about a forming mandrel to form an inner tube wall zone on the mandrel, spirally winding one or more intermediate plies to form at least a first intermediate layer having gaps between consecutive turns of the one to a plurality of intermediate plies, spirally winding one or more intermediate plies to form at least one support layer, spirally winding one or more intermediate plies to form at least a second intermediate layer opposite the support layer or layers from the first intermediate layer and having gaps between consecutive turns of the one to plurality of intermediate plies, wherein the gaps of the second intermediate layer are radially aligned with the intermediate plies of the first intermediate layer and the gaps of the first intermediate layer are radially aligned with the intermediate plies of the second intermediate layer, and spirally winding from one to a plurality of outer plies for forming an outer tube wall zone.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings in which some but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
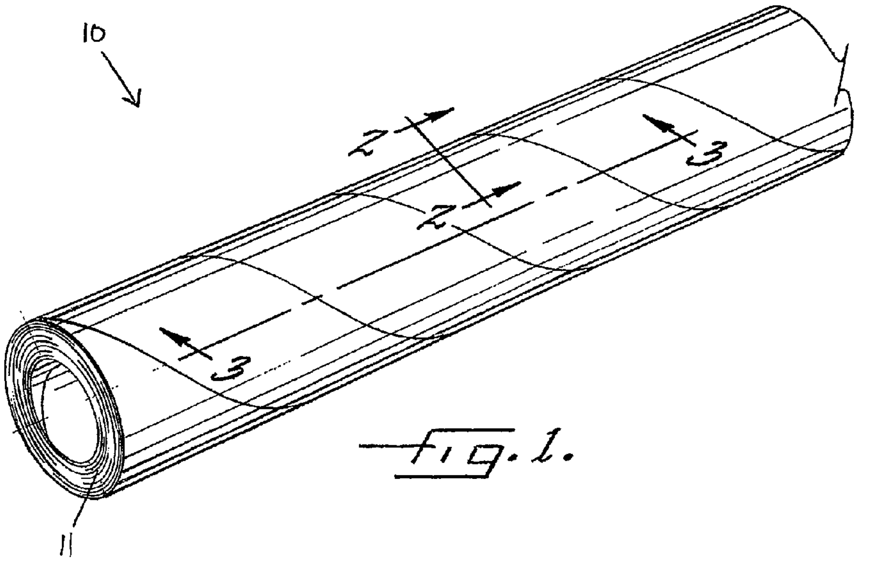
FIG. 1 is a perspective view of a tube according to one embodiment of the present invention.
Figure 2:
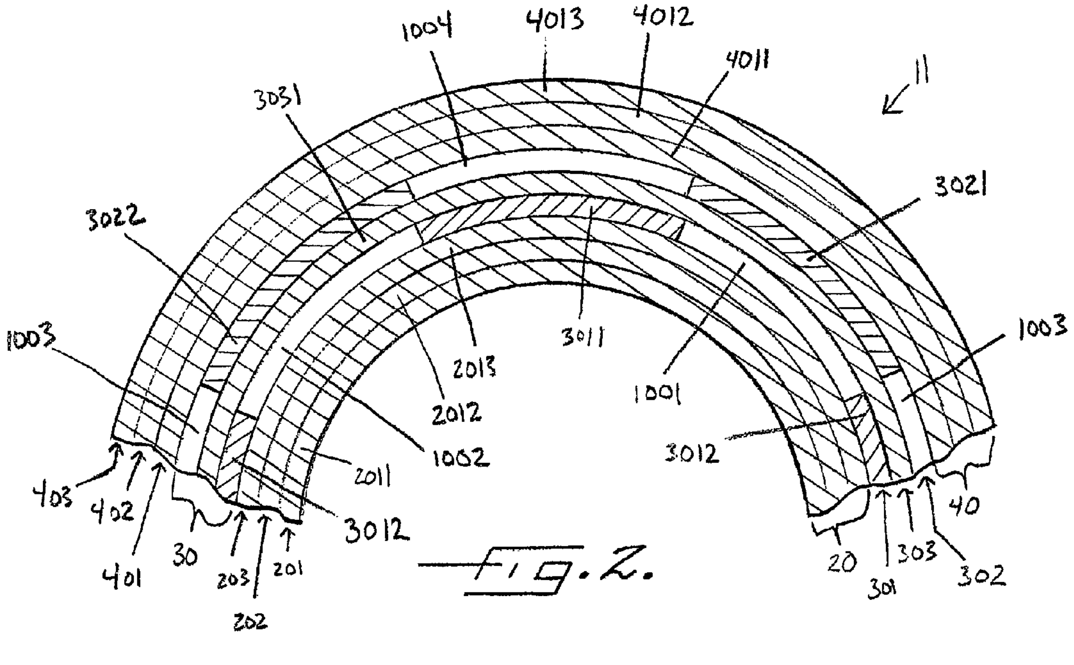
FIG. 2 is a partial cross-sectional view of the tube shown in FIG. 1 taken substantially along line 2-2.
Figure 3:
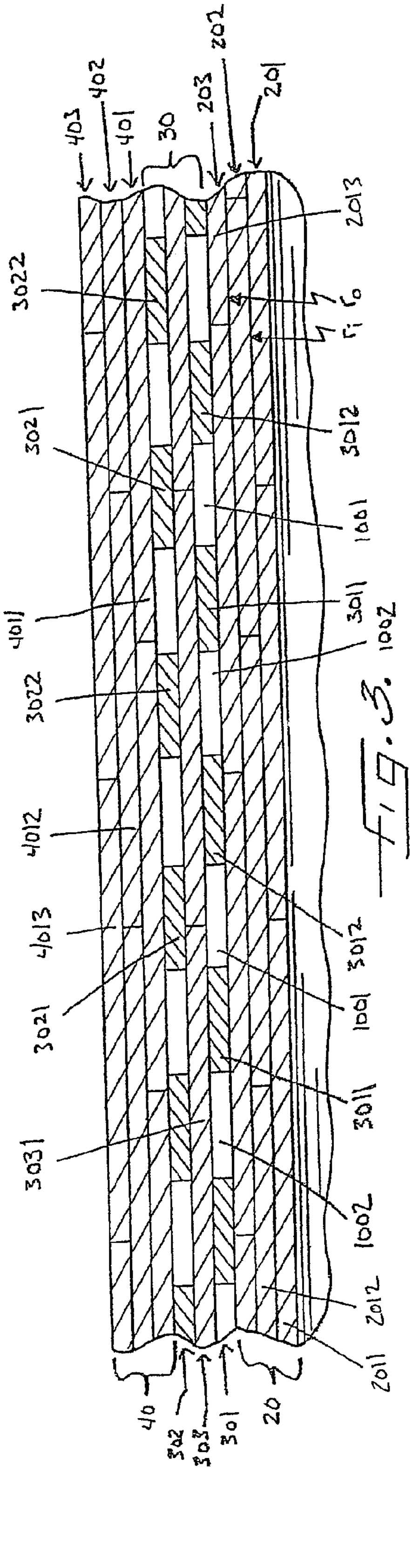
FIG. 3 is a cross-sectional view of the tube shown in FIG. 1 taken substantially along line 3-3.

FIGS. 1 through 3 show a spirally wound tube 10 in accordance with one embodiment of the present invention. The tube 10 extends around and along an axis for a predetermined length from a first end to a second end. As best shown in FIG. 2, the cross-section of the tube relative to the axis defines a circumference.

As illustrated in FIGS. 2 and 3, the tube includes a wall 11 having an inner zone 20, an intermediate zone 30, and an outer zone 40. The inner zone 20 is located inwardly and radially extends from an inner surface of the tube to the intermediate zone 30. The intermediate zone 30 radially extends from the inner zone 20 to the outer zone 40. The outer zone 40 is located outwardly and radially extends from the intermediate zone 30 to an outer surface of the tube. The inner surface defines an inner diameter of the tube and the outer surface defines an outer diameter of the tube. The inner and outer zones 20, 40 comprise one or more layers, and each layer in turn comprises one or more plies. For example, according to the illustrated embodiment of FIGS. 1 through 2, the inner and outer zones 20, 40, each have three layers 201, 202, 203, 401, 402, 403. Layers in the inner zone are referred to herein as inner layers and layers in the outer zone are referred to herein as outer layers due to the location of the layers. The intermediate zone 30 comprises three or more layers, and each layer in turn comprises one or more plies. For example according to the illustrated embodiment of FIGS. 2 through 3, the intermediate zone 30 has three layers 301, 302, 303. Each layer in intermediate zone is referred to herein as an intermediate layer or an intermediate support layer due to the layer's location.

As used herein, a "layer" is a region of the tube 10 delimited by an outer radius $r_o$ and an inner radius $r_i$ that respectively correspond to an outer surface and inner surface of a "ply" of that layer as best seen in FIG. 3. A "ply" is a unitary sheet of material that, when wound into the tube 10, constitutes at least a part of a single layer of the tube 10. Thus, in accordance with the present invention, a layer can comprise more than one ply occupying the region bound by $r_o$ and $r_i$.

In the illustrated embodiments, each inner layer 201, 202, 203 respectively includes one ply 2011, 2012, 2013, also referred to herein as an inner ply due to its location within an inner layer. Each inner ply 2011, 2012, 2013 is wound so that nominally it has no substantial gaps between its adjacent edges along the length of the tube 10 as generally described in U.S. Pat. No. 6,851,643. "Nominally" means that the objective is to wind the ply so that a perfect butt joint exists between the adjacent edges. However, in practice, a perfect butt joint may not always be achieved, and typically small gaps are inadvertently created between the edges of the ply. In general, such inadvertent gaps will be relatively small compared to the width of the plies.

Similarly, each outer layer 401, 402, 403 respectively includes one ply 4011, 4012, 4013, also referred to herein as an outer ply due to its location within an outer layer. Each outer ply 4011, 4012, 4013 is wound so that nominally it has no substantial gaps between its adjacent edges along the length of the tube 10.

It should also be noted, as further described in U.S. Pat. No. 6,851,643, it is known from geometrical considerations applicable to spiral winding that to achieve a perfect butt joint, the width of ply, the diameter of the ply, and the spiral wind angle are related. Basically, the width, the angle, or both must increase as the diameter of the ply increases. Therefore, one in the art would appreciate that either the spiral wind angle, the width of the ply, or both may vary between layers to account for the above-mentioned geometrical considerations.

Each intermediate layer has one or more plies, referred herein as intermediate plies or intermediate support plies due to their location. In contrast to the inner layers 201, 202, 203 and outer layers 401, 402, 403, at least two of the intermediate layers 301, 302, referred to herein for illustrative purposes only as a first intermediate layer 301 and a second intermediate layer 302, are wound such that a gap exists between consecutive turns of a ply or adjacent plies. For example, according to the illustrated embodiment of FIGS. 2 and 3, the first intermediate layer 301 has two intermediate plies 3011, 3012 and the second intermediate layer 302 has two intermediate plies 3021, 3022. (As additional examples, in other embodiments, an intermediate layer may have three or four intermediate plies.) In embodiments where each of the first and second intermediate layers has more than one ply, e.g. the illustrated embodiment of FIGS. 2 and 3, relatively wide gaps 1001, 1002, 1003, 1004 are intentionally created between the adjacent plies 3011, 3012, 3021, 3022 of each layer 301, 302, as described in U.S. application Ser. No. 11/225,547 assigned to the assignee of the present application and hereby incorporated by reference in its entirety. In embodiments where each of the first and second intermediate layers 301, 302 has only one intermediate ply 3011, 3021, such as in the illustrated embodiment of the FIG. 4, a relatively wide gap is intentionally created between the adjacent edges of consecutive turns of each ply 3011, 3021. Each gap extends helically along the tube at the spiral wind angle at which the ply or plies are wound.

In intermediate layers having intentionally created gaps, the intermediate plies may be substantially narrower than the outer and inner plies or the intermediate plies in each intermediate layer free of intentionally created gaps. The substantially narrower intermediate plies are for forming the gaps and may be "mini-plies," as described in U.S. application Ser. No. 11/225,547.

As shown in FIGS. 2 and 3, the first intermediate layer 301 and the second intermediate layer 302 are spirally wound such that the intermediate plies 3011, 3012, 3021, 3022 and gaps 1001, 1002, 1003, 1004 of the layers are radially aligned opposite of each other. More specifically, the intermediate ply or plies 3011, 3012 of the first intermediate layer 301 are radially aligned with the gap or gaps 1003, 1004 of the second intermediate layer 302 and the intermediate ply or plies 3021, 3022 of the second intermediate layer 302 are radially aligned with the gap or gaps 1001, 1002 of the first intermediate layer 301. A ply and a gap are generally considered radially aligned if the center of the ply and the center of the gap are substantially aligned along a radius of the tube. Although the gaps and intermediate plies are illustrated as having substantially equal widths in FIGS. 2 and 3, the width of the gaps compare to the width of the intermediate plies of the first and second intermediate layers may vary. In other words, the widths of the gaps may be less than, equal to, or greater than the widths of the intermediate plies of the first and second intermediate layers.

The intermediate zone further includes one or more intermediate support layers radially between the first and second intermediate layers. (Labeling these layers, as well as their respective plies, as "support" is primary to illustrate that the layers are positioned between the first and second intermediate layers and should not be construed as a limitation beyond being positioned between the first and second intermediate layers.). For example and according to the embodiment of FIGS. 2 and 3, the intermediate zone 30 may have one intermediate support layer 303 that is radially between the first and second intermediate layers 301, 302. The intermediate support layer 303 may have one or more intermediate support plies and may be spirally wound to have one or more gaps between adjacent edges as in the first and second intermediate layers 301, 302 or substantially no gaps as in the inner and outer layers 201, 202, 203, 401, 402, 403. However, the intermediate support layer 303 is spirally wound such that at least some of the intermediate support ply or plies of the intermediate support layer extend radially across at least some of the gaps of either or both of the first and second intermediate layers. For example, in the illustrated embodiment of FIGS. 2 and 3, the intermediate support layer 303 has one intermediate support ply 3031 that is spirally wound so that nominally it has no substantial gaps between its adjacent edges along the length of the tube 10 and the intermediate support ply 3031 of the intermediate support layer 303 radially extends across the gaps 1001, 1002, 1003, 1004 of the first and second intermediate layers 301, 302.

The widths of the plies in the intermediate layers and the intermediate support layers may vary relative to each other or to the gaps. For example, as shown in the illustrated embodiment, the width of each first and second intermediate plies 3011, 3012, 3021, 3022 in each of the first and second intermediate layers 301, 302 may be less than half the width of the intermediate support ply 3031 of the at least one support layer 303. The width of the first and second intermediate plies 3011, 3012, 3021, 3022 of each of the first and second intermediate layers 301, 302 may be less than, equal to, or greater than the first and second gaps 1001, 1002, 1003, 1004 of each of the first and second intermediate layers 301, 302.

In some embodiments, for each intermediate layer 301, 302, the total width of the intermediate plies 3011, 3012, 3021, 3022 and the gaps 1001, 1002, 1003, 1004 may be substantially equal to the width of an intermediate support ply 3031. Therefore, in such embodiments, the widths of the intermediate plies 3011, 3012, 3021, 3022 and width the gaps 1001, 1002, 1003, 1004 may have an inverse relationship, i.e., the greater the widths of the plies, the lesser the widths of the gaps and the lesser the widths of the plies, the greater the widths of the gaps. As examples, the total width of the two intermediate plies per intermediate layer of the illustrated embodiment may equal to be three-fourths, two-thirds, one-half, one-thirds, or one-fourths of the width of the support ply and, thus, the total widths of the two gaps per intermediate layer of the illustrated embodiment may be one-fourths, one-thirds, one-half, two-thirds, or three-fourths respectively of the width of the support ply.

Figure 5:
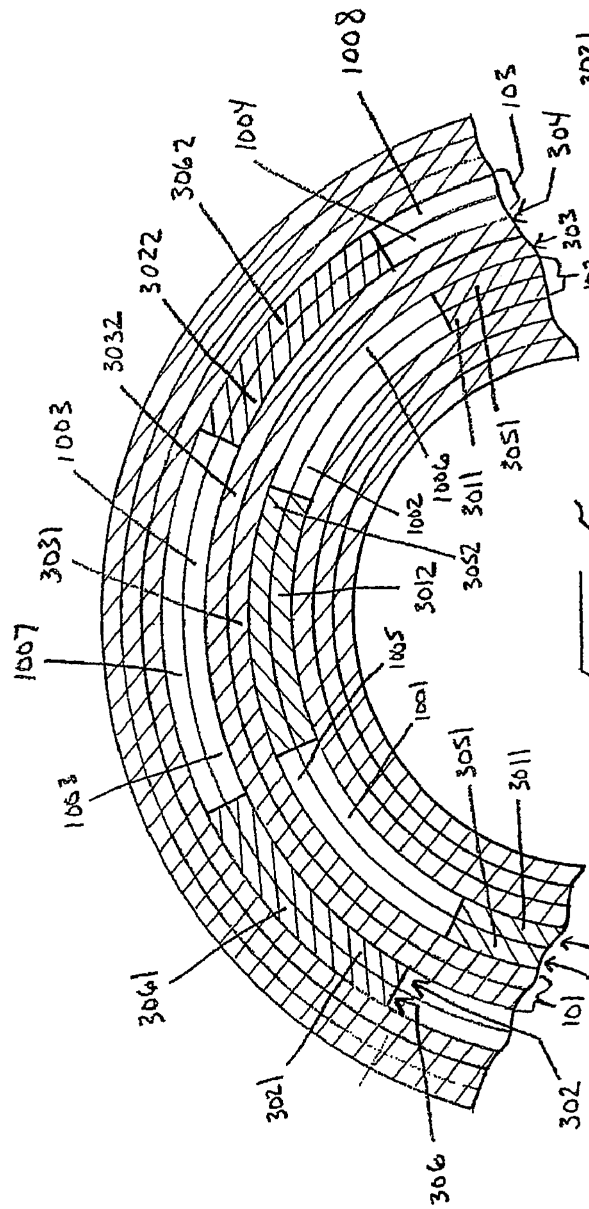
FIG. 5 is a partial cross-sectional view as in FIG. 2 of the tube according to yet another embodiment of the present invention.
Figure 6:
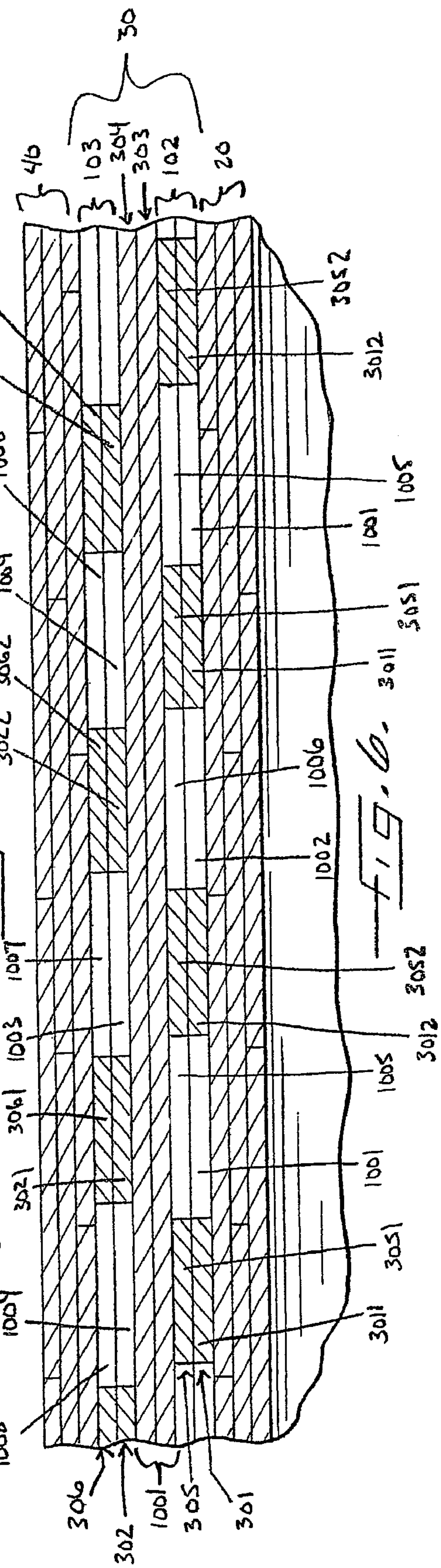
FIG. 6 is a cross-sectional view as in FIG. 3 of the tube shown in FIG. 5.

According to another embodiment of the present invention, each of the first and second intermediate layers, as well as the intermediate support layer, may be part of a set of intermediate layers. A set of intermediate layers is a number of intermediate layers radially adjacent to one another. For example, the intermediate zone may have a first set of intermediate layers that includes a third intermediate support layer 303 and at least one additional intermediate support layer. According to the illustrated embodiment of FIGS. 5 and 6, the first set 101 includes the third intermediate support layer 303 and a fourth intermediate support layer 304. As shown, the fourth intermediate support layer 304 may be radially adjacent to the second intermediate layer 302 and be spirally wound so that nominally it has no substantial gaps between its adjacent edges along the length of the tube 10 and that the intermediate support ply 3032 (or plies) of the fourth intermediate support layer 302 radially extends across the gaps 1003, 1004 of the second intermediate layer 301. Although not illustrated, the first set 101 may include additional intermediate layers between the third and fourth intermediate support layers 303, 304.

The intermediate zone 30 may have a second set 102 of intermediate layers in addition to or instead of the first set 101 of intermediate support layers. The second set of the intermediate layers may include the first intermediate layer and at least one additional intermediate layer. According to the illustrated embodiment of FIGS. 5 and 6, the second set 102 includes the first intermediate layer 301 and a fifth intermediate layer 305. The fifth intermediate layer 305 is radially adjacent to the first intermediate layer 301 and spirally wound such that each intermediate ply 3051, 3052 of the fifth intermediate layer is substantially aligned with an intermediate ply 3011, 3012 of the first intermediate layer and each gap 1005, 1006 of the fifth intermediate layer is substantially aligned with a gap 1001, 1002 of the first intermediate layer. Aligning the gaps 1001, 1002, 1005, 1006 of the first and fifth intermediate layers 301, 305 form "voids" as further described in U.S. application Ser. No. 11/225,547. Although not illustrated, the second set 102 may include additional intermediate layers that are radially adjacent to one another and spirally wound such that the intermediate plies of the additional layers substantially align with the intermediate plies of the first and fifth intermediate layers 301, 305 and the gaps of the additional layers substantially align with the gaps of the first and fifth intermediate layers 301, 305.

The intermediate zone 30 may have a third set 103 of intermediate layers in addition to or instead of one or both of the first set 101 and second set 102 of intermediate layers. The third set 103 of the intermediate layers may include the second intermediate layer and at least one additional intermediate layer. According to the illustrated embodiment of FIGS. 5 and 6, the third set 103 includes the second intermediate layer 302 and a sixth intermediate layer 306. The sixth intermediate layer 306 is radially adjacent to the second intermediate layer 302 and spirally wound such that each intermediate ply 3061, 3062 of the sixth intermediate layer is substantially aligned with an intermediate ply 3021, 3022 of the second intermediate layer and each gap 1007, 1008 of the sixth intermediate layer is substantially aligned with a gap 1003, 1004 of the second intermediate layer. Although not illustrated, the third set 102 may include additional intermediate layers that are radially adjacent to one another and spirally wound such that the intermediate plies of the additional layers substantially align with the intermediate plies of the first and fifth intermediate layers 302, 306 and the gaps of the additional layers substantially align with the gaps of the first and fifth intermediate layers 302, 306.

One in the art should appreciate that additional sets of intermediate layers and/or additional individual intermediate layers may be added to the present invention beyond what is discussed above or illustrated in the appended figures of the present application.

As further discussed below, the present invention provides increased I.D. stiffness and/or increased O.D. stiffness. It is believed that the intermediate zone functions as a spring or springs between the inner zone and the outer zone. Specifically, the intermediate zone allows radial deflection of the inner zone toward the outer zone while reducing the deformation of the outer zone, i.e. the springs absorb at least some of the deformation rather than the outer zone. Similarly, the intermediate zone also allows radial deflection of the outer zone toward the inner zone while reducing the deformation of the inner zone.

Different core embodiments of the present invention were tested and compared against conventional prior art paper tubes, referred to as a "control solid core." Listed below are the details of the control solid cores, the tested embodiments, and the comparison of the ID stiffness of the tested embodiments to the control solid cores. One in the art should appreciate that the tested embodiments are for testing and illustrative purposes only and do not represent any limitations to the present invention.

During a first group of testing, a first control solid core (referred to below as "1$^{st}$ Control Solid Core") was compared to five different embodiments of the present invention (referred to below as 1$^{st}$ through 5$^{th}$ Tested Embodiments). Each core generally had the same inner and outer zones. Specifically each inner zone had four inner layers, each inner layer included one inner ply and each inner ply had a density of 0.661 g/cm^3 and a relative low strength. The innermost layer had a caliper thickness of 0.025" and each of the remaining three inner layers had a caliper thickness of 0.030". Each outer zone had four outer layers. The outermost layer had one outer ply that had a caliper thickness of 0.013", a density of 0.759 g/cm^3 and relative low-medium strength. The second outermost layer had one outer ply that had a caliper thickness of 0.025", a density of 0.661 g/cm^3, and relative low strength. Each of the two remaining outer layers had a caliper thickness of 0.030", a density of 0.661 g/cm^3, and relative low strength.

The differences between the control solid cores and the different tested embodiments were generally in the number and structure of the intermediate layers of the intermediate zone in the respective core or embodiments. Specifically, the intermediate zone of the control solid core and the tested embodiments of the present invention were the following:

1$^{st}$ Control Solid Core

Four intermediate layers, wherein each layer includes one intermediate ply having a caliper thickness of 0.025", a density of 0.661 g/cm^3, and relative low strength.

1$^{st}$ Tested Embodiment

A first intermediate layer having two intermediate plies and gaps between adjacent edges of the two intermediate plies, each intermediate ply having a caliper thickness of 0.025", a density of 0.711 g/cm^3, and relative medium strength;

Two intermediate support layers, wherein each layer includes one intermediate ply having a caliper thickness of 0.025", a density of 0.711 g/cm^3, and relative medium strength; and A second intermediate layer having two intermediate plies and gaps between adjacent edges of the two intermediate plies, each intermediate ply having a caliper thickness of 0.025", a density of 0.711 g/cm^3, and relative medium strength.

2$^{nd}$ Tested Embodiment

A first intermediate layer having two intermediate plies and gaps between adjacent edges of the two intermediate plies, each intermediate ply having a caliper thickness of 0.025", a density of 0.711 g/cm^3, and relative medium strength;

Two intermediate support layers, wherein each layer includes one intermediate ply having a caliper thickness of 0.025", a density of 0.711 g/cm^3, and relative medium strength; and A second intermediate layer having two intermediate plies and gaps between adjacent edges of the two intermediate plies, each intermediate ply having a caliper thickness of 0.025", a density of 0.711 g/cm^3, and relative medium strength.

3$^{rd}$ Tested Embodiment

A first intermediate layer having two intermediate plies and gaps between adjacent edges of the two intermediate plies, each intermediate ply a caliper thickness of 0.025", a density of 0.711 g/cm^3, and relative medium strength;

Two intermediate support layers, wherein each layer includes one intermediate ply a caliper thickness of 0.025", a density of 0.711 g/cm^3, and relative medium strength; and A second intermediate layer having two intermediate plies and gaps between adjacent edges of the two intermediate plies, each intermediate ply having a caliper thickness of 0.025", a density of 0.711 g/cm^3, and relative medium strength.

4th Test Embodiment

A first intermediate layer having two intermediate plies and gaps between adjacent edges of the two intermediate plies, each intermediate ply having a caliper thickness of 0.025", a density of 0.711 g/cm^3, and relative medium strength;

Two intermediate support layers, wherein each layer includes one intermediate ply having a caliper thickness of 0.025", a density of 0.711 g/cm^3, and relative medium strength; and A second intermediate layer having two intermediate plies and gaps between adjacent edges of the two intermediate plies, each intermediate ply having a caliper thickness of 0.025", a density of 0.711 g/cm^3, and relative medium strength.

5th Tested Embodiment

A first and a fifth intermediate layer, wherein each layer includes two intermediate plies and gaps between adjacent edges of the two intermediate plies, each intermediate ply having a caliper thickness of 0.025", a density of 0.711 g/cm^3, and relative medium strength;

Two intermediate support layers, wherein each layer includes one intermediate ply having a caliper thickness of 0.025", a density of 0.711 g/cm^3, and relative medium strength; and A second and a sixth intermediate layer, wherein each layer includes two intermediate plies and gaps between adjacent edges of the two intermediate plies, each intermediate ply having a caliper thickness of 0.025", a density of 0.711 g/cm^3, and relative medium strength.

The following table illustrates the improvement to the ID stiffness of the tested embodiments compared to the 1st Control Solid Core:

| Embodiment | ID Stiffness Improvement |
|---|---|
| 1st Tested Embodiment | 68% |
| 2nd Tested Embodiment | 35% |
| 3rd Tested Embodiment | 14% |
| 4th Tested Embodiment | 7% |
| 5th Tested Embodiment | 148% |

During a second group of testing, a second control solid core (referred to below as "2nd Control Solid Core") was compared to one embodiment of the present invention (referred to below as the 6th Tested Embodiment). The 2nd Control Solid Core had the following layer structure:

an inner zone having one inner layer, the inner layer having one inner ply, the inner ply having a caliper thickness of 0.020", a density of 0.711 g/cm^3 and relative medium-high strength;

an intermediate zone having seven intermediate layers, each intermediate layer having one intermediate ply, each intermediate ply having a caliper thickness of 0.022", a density of 0.759 g/cm^3, and a relative high strength;

an outer zone having a first outer layer radially adjacent to the intermediate zone, the first outer layer having one outer ply that has a caliper thickness of 0.022", a density of 0.759 g/cm^3, and a relative high strength, and a second outer layer having one outer ply that has a caliper thickness of 0.013", a density of 0.759 g/cm^3 and relative low-medium strength.

The sixth tested embodiment had the following layer structure:

an inner zone having two inner layers, each inner having one inner ply, the innermost layer having a caliper thickness of 0.020" a density of 0.711 g/cm^3 and medium-high strength and the other inner layer having a caliper thickness of 0.022", a density of 0.759 g/cm^3 and relative high strength;

an intermediate zone having a first set of two intermediate layers, each layer of the first set has one ply with a caliper thickness of 0.025", a density of 0.661 g/cm^3 and relative low-medium strength and one gap, the layers of the first set of intermediate layers are radially align such that the ply of one layer radially aligns with the ply of the other layer and the gap of one layer radially aligns with the gap of the other layer; a set of support layers extending radially outward from the first set of two intermediate layers, the set of support layers includes two support layers, each support layer includes one support ply having a caliper thickness of 0.022", a density of 0.759 g/cm^3 and relative high strength; and a second set of two intermediate layers radially opposite of the set of support layers from the first set of two intermediate layers, each layer of the second set has one ply with a caliper thickness of 0.025", a density of 0.661 g/cm^3 and relative low-medium strength and one gap, the layers of the second set of intermediate layers are radially align such that the ply of one layer radially aligns with the ply of the other layer and the gap of one layer radially aligns with the gap of the other layer, and wherein the layers of the second set of two intermediate layers is radially offset from the layers of the first set of two intermediate layers such that the gaps of one set radially aligns with the plies of the other set; and an outer zone having two outer layers radially adjacent to the intermediate zone, wherein each of the two outer layers has one outer ply having a caliper thickness of 0.022", a density of 0.759 g/cm^3 and relative high strength, the outer zone further having a second outermost layer having one outer ply with a caliper thickness of 0.022", a density of 0.759 g/cm^3, and relative high strength, and an outermost layer having one outer ply with a caliper thickness of 0.022", a density of 0.759 g/cm^3 and relative low-medium strength.

The following table illustrates the improvement to the ID stiffness of the 6th tested embodiment compared to the 2nd Control Solid Core:

| Embodiment | ID Stiffness Improvement |
|---|---|
| 6th Tested Embodiment | 810% |

Figure 4:
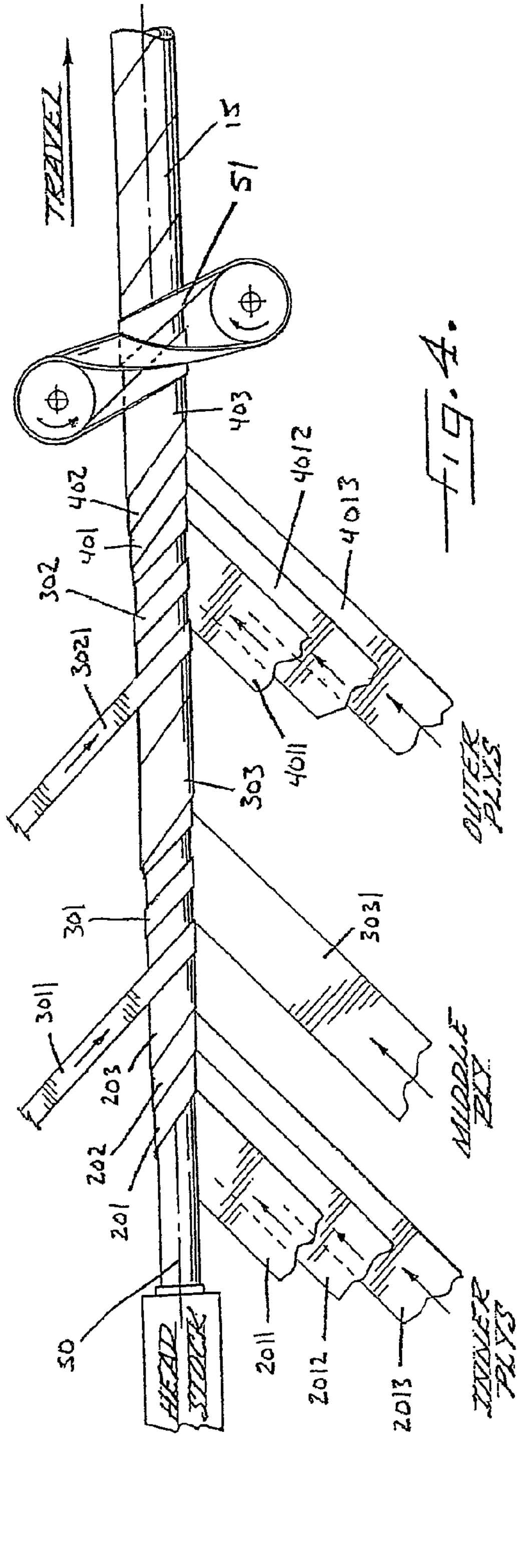
FIG. 4 is a partial plan view of an apparatus for forming a tube according to another embodiment of the present invention.

Another aspect of the present invention is a method or process of forming the tube 10. In general, the tube 10 is formed by spirally winding a plurality of plies about a mandrel 50, adhering the plies together, and severing portions or sections of the spirally wound plies to form individual tubes 10. FIG. 4 illustrates one method of making the paper tube 10 according to one embodiment of the present invention. The plies are drawn from respective creels (not shown) and routed along a path to the mandrel 50. Each ply may have an adhesive applied to it at an adhesive applying station (not shown) such as a glue pot for adhering to adjacent plies. The inner plies 2011, 2012, 2013 are applied to the mandrel 50 and spirally wound to form the inner layers 201, 202, 203 and thus the inner zone of the tube. Downstream from the inner plies 2011, 2012, 2013, the intermediate plies 3011, 3031, 3021 are applied on top of the inner zone and spirally wound to form the intermediate layers and thus the intermediate zone of the tube. More specifically, the intermediate ply 3011 (or plies) of a first intermediate layer are applied to the mandrel 50 on top of the inner zone with a gap 1001 (or gaps) between the adjacent edges of the ply 3011. Next, the ply 3031 (or plies) of a intermediate support layer 303 is applied to the mandrel 50 on top of the first intermediate layer 301 such that the ply 3031 of the intermediate support layer extends across the gap 1001 of the first intermediate layer 301. The ply 3021 (or plies) of the second intermediate layer is applied to the mandrel 50 on top of the intermediate support layer 303 with a gap 1003 (or gaps) between the adjacent edges of the ply 3021 and the gap 1003 of the second intermediate layer is radially aligned with the ply 3011 of the first intermediate layer. Additional intermediate layers may be applied to form sets of intermediate layers as described above. After applying the last intermediate layer and forming the intermediate zone, the outer plies 4011, 4012, 4013 are applied on top of the intermediate zone and spirally wound to form the outer layers 401, 402, 403 and thus the outer zone of the tube. A cut-off station (not shown) may be included to cut the continuous tube 15 formed by the spirally winding of the plies into discrete lengths to form individual tubes 10. A winding belt 51 rotates the continuous tube 15 in a screw fashion such that the tube 15 advances down the mandrel 50.

Many modifications and other embodiments of the invention set forth herein will come to mind to one skilled in the art to which this invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A spirally wound tube, comprising:

an inner zone, an outer zone, and an intermediate zone;

the inner zone being located radially inwardly and including at least one inner layer, each inner layer including at least one inner ply;

the outer zone being located radially outwardly and including at least one outer layer, each outer layer including at least one outer ply; and the intermediate zone being located between the outer zone and the inner zone and comprising:

one to a plurality of support layers;

a first intermediate layer disposed radially outwardly of and adjacent to an outer side of the support layers and including one to a plurality of first intermediate plies that are wound such that there are first gaps between adjacent edges of the first intermediate plies;

at least one additional intermediate layer adjacent the first intermediate layer, wherein the at least one additional intermediate layer has one to a plurality of intermediate plies that are spirally wound with one to a plurality of gaps between adjacent edges of the intermediate plies such that the gaps of the at least one additional intermediate layer are radially aligned with the first gaps of the first intermediate layer; and a second intermediate layer disposed radially inwardly of and adjacent to an inner side of the support layers and including one to a plurality of second intermediate plies that are wound such that there are second gaps between adjacent edges of the second intermediate plies;

wherein at least some of the first gaps are radially aligned with at least some of the second intermediate plies and at least some of the second gaps are radially aligned with at least some of the first intermediate plies, such that the first and second gaps allow radial displacement of the support layers into the gaps under radial loading of the tube, the support layers thereby acting as springs in the intermediate zone for absorbing radial deformation.

2. The tube according to claim 1, wherein each support layer includes one support ply that is wound with substantially no gaps between adjacent edges of the support ply.

3. The tube according to claim 1, wherein the intermediate zone has one support layer.

4. The tube according to claim 1, wherein the intermediate zone includes a plurality of support layers.

5. The tube according to claim 1, wherein the intermediate zone includes at least one further intermediate layer adjacent the second intermediate layer, wherein the at least one further intermediate layer has one to a plurality of intermediate plies that are spirally wound with one to a plurality of gaps between adjacent edges of the intermediate plies, and the gaps of the at least one further intermediate layer are radially aligned with the second gaps of the second intermediate layer.

6. The tube according to claim 5, wherein each of the first and additional intermediate layers has two intermediate plies and each of the second and further intermediate layers has two intermediate plies.

7. The tube according to claim 1, wherein each support layer includes one to a plurality of support plies and each support ply defines a width and each first and second intermediate ply defines a width, wherein the width of each first intermediate ply and the width of each second intermediate ply is less than half the width of each support ply.

8. The tube according to claim 1, wherein the inner zone has at least four inner layers, each inner layer having one inner ply that is spirally wound with substantially no gaps between adjacent edges of the inner ply, and the outer zone has at least four outer layers, each outer layer having one outer ply that is spirally wound with substantially no gaps between adjacent edges of the outer ply.

9. A method of constructing a paperboard tube comprising:

spirally winding from one to a plurality of inner plies about a forming mandrel to form an inner tube wall zone on the mandrel;

spirally winding from one to a plurality of intermediate plies to form at least a first intermediate layer having gaps between consecutive turns of the one to a plurality of intermediate plies;

spirally winding from one to a plurality of intermediate plies to form at least one support layer;

spirally winding one to a plurality of the intermediate plies to form at least a second intermediate layer opposite the support layer from the first intermediate layer and having gaps between consecutive turns of the one to plurality of intermediate plies, wherein the gaps of the second intermediate layer are radially aligned with the intermediate plies of the first intermediate layer and the gaps of the first intermediate layer are radially aligned with the intermediate plies of the second intermediate layer;

spirally winding from one to a plurality of intermediate plies to form additional intermediate layers having gaps between consecutive turns of the one to a plurality of intermediate plies, wherein the gaps of the additional layers are radially aligned to either the one to a plurality of intermediate plies of the first intermediate layer or the one to a plurality of intermediate plies of the second intermediate layer; and spirally winding from one to a plurality of outer plies for forming an outer tube wall zone.

10. The method of claim 9, wherein the at least one support layer is spirally wound with substantially no gaps between consecutive turns of the one to a plurality of the intermediate plies.

11. The method of claim 9 further including spirally winding at least one additional support layer.

* * * * *